UNITED STATES PATENT OFFICE.

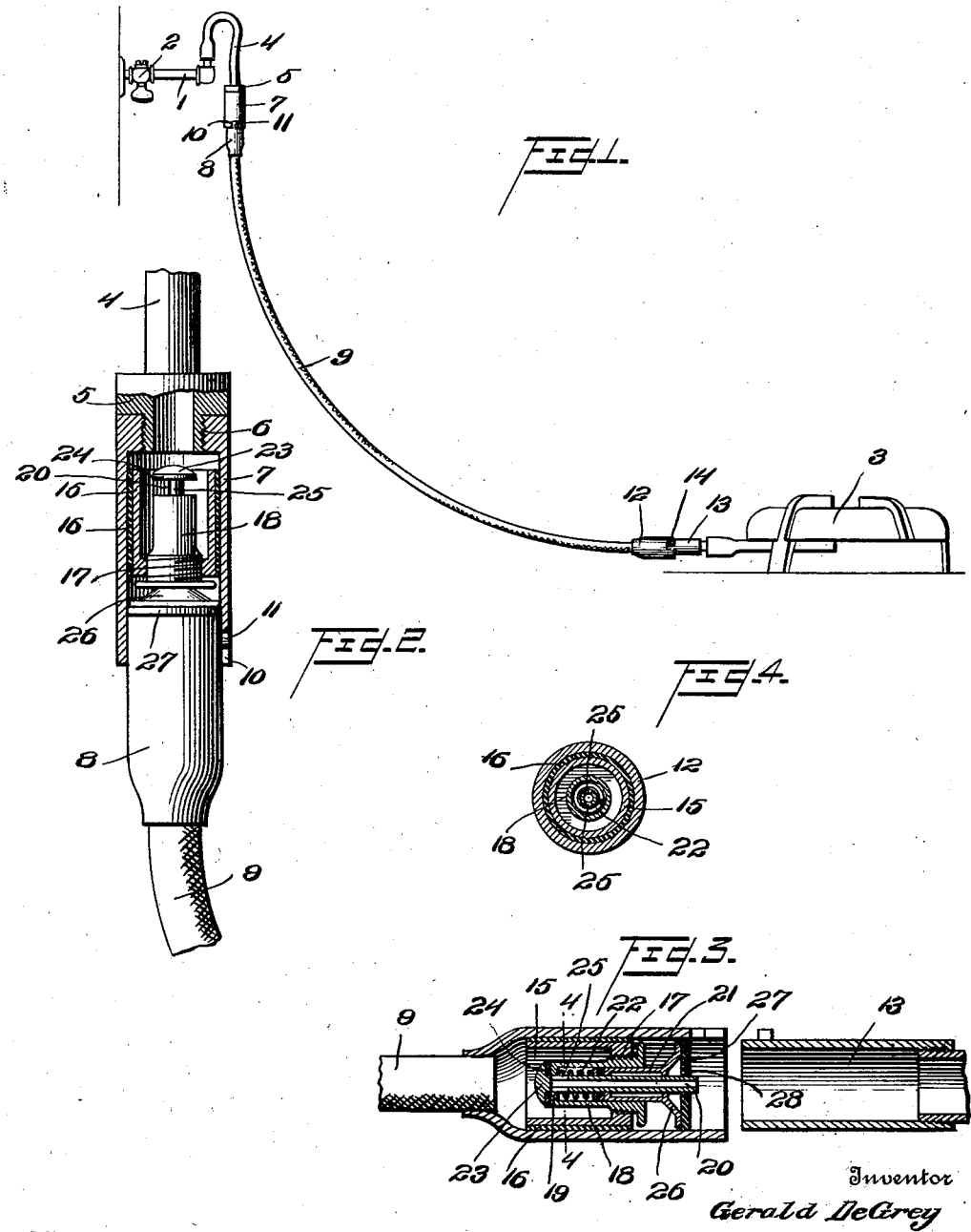

GERALD DE GREY, OF PHILADELPHIA, PENNSYLVANIA.

SAFETY CONNECTION FOR GAS-FIXTURES.

1,017,654.  Specification of Letters Patent.  Patented Feb. 20, 1912.

Application filed August 15, 1911. Serial No. 644,149.

*To all whom it may concern:*

Be it known that I, GERALD DE GREY, a subject of the King of Great Britain, residing at Philadelphia, in the county of Philadelphia and State of Pennsylvania, have invented certain new and useful Improvements in Safety Connections for Gas-Fixtures, of which the following is a specification.

My invention relates to improvements in safety connections for gas fixtures, the object of the invention being to provide an improved connection which is utilized at both ends of a gas tube, one of which serves as a connection between the gas fixture or source of gas supply, and the tube, and the other between the tube and the burner or stove.

A further object is to provide a connection of this character which comprises two members, one adapted to telescope within the other and to be securely locked therein, and when so projected one within the other, the gas controlling valve will be opened, and when the members are separated either through accident or design, the valve will automatically close.

With these and other objects in view, the invention consists in certain novel features of construction and combinations and arrangements of parts, as will be more fully hereinafter described and pointed out in the claims.

In the accompanying drawings: Figure 1, is a view in elevation illustrating my improvements. Fig. 2, is a view partly in longitudinal section and partly in elevation, illustrating the connection between the source of gas supply and the tube. Fig. 3, is a view in longitudinal section of the connection at the burner or stove, showing the two member apart, and Fig. 4, is a view in cross section on the line 4—4 of Fig. 3.

1, represents a gas bracket having the ordinary valve 2, and 3 is a burner or stove. On the gas bracket 1, a goose neck 4 is supported, and the enlarged lower end 5 of this goose neck is screw-threaded as shown at 6 to screw into the threaded end of member 7 of my improved connection.

Member 7, and its coöperating member 8, are both cylindrical in form, the latter fixed to a flexible gas tube 9, and adapted to telescope within the member 7. Member 7 is provided with an L-shaped notch 10 to receive a pin 11 on member 8, so that an ordinary bayonet joint is formed to lock the members together. On the opposite end of the tube 9, a member 12 is secured, and corresponds to the member 7. The member 13, which corresponds to member 8 is screwed onto the burner 3, and telescopes within member 12, and is secured by a bayonet joint 14, such as above described in connection with the members 7 and 8.

The members 7 and 12 each contain improved valve structures which are precisely alike, and in fact, these connections at the respective ends of the hose, are alike, except in the manner of attachment which necessitates a slight change in the structure. As these valves are precisely alike, the description hereinafter of one will apply alike to both.

In cylindrical members 7 and 12, metal sleeves 15 are located, and are held by rubber sleeves 16 around the same, said rubber sleeves serving to make the connection gas tight. One end of metal sleeve 15 has a screw-threaded opening 17 to receive an externally screw-threaded tube 18. At the inner end of this tube 18, an internal flange 19 is provided, and constitutes a guide for a tubular valve stem 20 which is secured in a guide sleeve 21 mounted to slide in tube 18. Around the stem 20 in the sleeve 18, between the guide sleeve 21 and the flange 19, a coiled spring 22 is located, and normally holds a valve 23 secured to the inner end of stem 20 on its seat. That is, the valve 23 with its facing washer 24, is held against the end of tube 18, and openings 25 which are provided in the stem 20 adjacent the valve 23, are held within the tube 18, so that the passage of gas through the stem is prevented. The forward end of the guide sleeve 21 is provided with a flaring disk 26 against which a disk 27 of rubber or other suitable material is positioned, and this disk 27 is provided with a central opening 28 through which the tubular valve stem 20 projects.

When the smaller member is forced inside of the larger member, it engages disk 27, and forces the valve stem 20 longitudinally against the action of the spring 22, so that the openings 25 are exposed back of the end of sleeve 18 as shown in Fig. 2. The gas may then flow through the valve stem to the burner, as the bayonet joint above described secures the members in this position. Should the members become separated either through accident or design, spring 22 will immediately close the valve and shut off the supply of gas, thus preventing any escape of gas and the danger which might result therefrom. This automatic shutting off of the gas is true at either point of connection, because the valve is within the parts 7 and 12, so that if the connection is broken at either point, the gas will be shut off.

The parts are so constructed that the valve may be readily removed for purposes of repair, as it is simply necessary to draw the sleeve 15 with its outer rubber sleeve 16 from within the cylindrical section, and force it back into place when the valve is repaired.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A connection of the character described, comprising two cylindrical members, one member adapted to telescope within the other, means for locking the members in telescoped position, a valve in one member moved by the other to open position, said valve comprising a sleeve, a tubular stem movable through said sleeve and having openings therein, a valve on the end of said stem, a guide sleeve secured around said stem and movable in the first mentioned sleeve, a coiled spring around the stem pressing against the guide sleeve and normally holding the valve in closed position, a flaring disk on the end of said guide sleeve, a second disk against the guide sleeve and having an opening through which the stem projects, the said last-mentioned disk engageable by the smaller member, substantially as described.

2. A connection of the character described, comprising two cylindrical members, one member adapted to telescope within the other, means for locking the members in telescoped position, a valve in one member moved by the other to open position, said valve comprising a sleeve, a tubular stem movable through said sleeve and having openings therein, a valve on the end of said stem, a guide sleeve secured around said stem and movable in the first-mentioned sleeve, a coiled spring around the stem pressing against the guide sleeve and normally holding the valve in closed position, a flaring disk on the end of said guide sleeve, a second disk against the guide sleeve and having an opening through which the stem projects, and said last-mentioned disk engageable by the smaller member, a sleeve frictionally held in the larger section, a packing sleeve around said last-mentioned sleeve, and said first-mentioned sleeve screwed into said frictionally held sleeve, substantially as described.

In testimony whereof I have signed my name to this specification in the presence of two subscribing witnesses.

GERALD DE GREY.

Witnesses:
C. R. ZIEGLER,
CHAS. E. POTTS.